United States Patent [19]

del Valle P. et al.

[11] Patent Number: 4,750,556
[45] Date of Patent: Jun. 14, 1988

[54] REACTOR APPARATUS

[75] Inventors: Daniel del Valle P.; David del Valle Macleod; Deborah del Valle Macleod, all of Mexico City, Mexico

[73] Assignee: Daniel del Valle P., Mexico City, Mexico

[21] Appl. No.: 924,484

[22] Filed: Oct. 29, 1986

[51] Int. Cl.$^4$ ............................................... F28F 3/12
[52] U.S. Cl. ...................................... 165/169; 165/96; 165/109.1
[58] Field of Search ............... 165/169, 109.1, 96

[56] References Cited

U.S. PATENT DOCUMENTS

| | | | |
|---|---|---|---|
| 814,993 | 3/1906 | Thompson | 165/169 X |
| 2,136,992 | 11/1938 | Heynssens | 165/169 |
| 2,482,261 | 9/1949 | Goddard | 165/169 X |
| 2,536,404 | 1/1951 | Walker | 165/169 X |
| 2,616,672 | 11/1952 | Lambeek | 165/169 |
| 3,877,881 | 4/1975 | Ono et al. | 23/285 |
| 4,025,058 | 5/1977 | Mizuguchi | 259/192 |
| 4,166,942 | 9/1979 | Vihl | 165/169 X |
| 4,172,877 | 10/1979 | Schwaig | 165/169 |
| 4,460,278 | 7/1984 | Matsubara et al. | 366/149 |
| 4,502,787 | 3/1985 | Broadhurst | 366/149 |
| 4,552,724 | 11/1985 | Matsumoto et al. | 165/169 X |

Primary Examiner—Ira S. Lazarus
Assistant Examiner—Peggy A. Neils
Attorney, Agent, or Firm—Pollock, Vande Sande & Priddy

[57] ABSTRACT

A reactor apparatus is provided with an outer jacket surrounding the reaction vessel. The jacket is formed by a plurality of baffles having triangular cross-section. At least some of the baffles are provided with adjustable deflectors. Heat exchanging fluid is admitted into the space between the jacket and the vessel outer wall. The triangular cross-section of the baffles and adjustable deflectors allow optimum regulation of reaction conditions, for example reaction temperature and in effect increase reactor productivity.

11 Claims, 3 Drawing Sheets

REACTOR APPARATUS

TECHNICAL FIELD

The present invention is concerned with reaction vessels for carrying out processes that require controlled conditions, and especially controlled temperature conditions. The apparatus of the present invention is especially advantageous for carrying out suspension polymerization processes. However, it also effective for carrying out polymerization processes in general including emulsion and solution polymerization processes.

BACKGROUND OF THE INVENTION

In order to maintain a suitable reaction temperature during the polymerization within a reaction vessel an exchange of heat through the vessel wall is required in order to remove the reaction heat generated by the process. Various polymerization processes produce a large amount of reaction heat. Accordingly, heat removal rate is a determining factor of the speed of the reaction, which in turn affects the amount of the product produced in any given amount of time.

The production rate can be increased by employing larger polymerization reaction vessels. However, this requires stronger and thicker vessel walls which in turn lower the amount of heat removed through the walls.

Reaction vessels with means that facilitate heat removal are known in the art. For instance, such known means include inner sleeves inserted into the reaction vessel or outer sleeves surrounding the vessel. A heat exchanging fluid such as water is passed through a space formed between the vessel walls and the sleeve allowing removal of the reaction heat. The inner sleeves have available diameter that is smaller than that of the vessel thereby reducing the available heat exchange area. Known types of dimple or half-pipe jackets are inefficient and therefore unsatisfactory.

There is still a need in the art for improvement of reactor apparatus efficiency. Moreover the need exists to provide more effective means for regulatory reaction conditions.

It is an object of the present invention to provide a reaction apparatus exhibiting improved heat removal through the vessel walls.

It is another object of the present invention to provide a reactor in which the reaction temperature can be regulated in a relatively easy manner to achieve optimum operating conditions.

The reactor of the present invention contains a jacket having a structure that provides an increase in reactor productivity by providing for a higher heat transfer co-efficient. The structure of the apparatus of the present invention also makes it possible to achieve lower heat exchange fluid consumption.

A reaction apparatus according to the present invention includes a reactor vessel and a jacket mounted onto and surrounding the reactor vessel. The jacket comprises a plurality of projections which will be referred to hereinafter as baffles. The baffles have substantially triangular cross-sections.

Means are provided for admitting heat exchanging fluid into the space formed between the wall of the reactor vessel and the jacket for regulating the temperature of the reaction. According to one embodiment of the invention the jacket is provided with a plurality of adjustable deflectors. A deflection angle between the jacket wall and a deflector can be regulated in the range of about 0° to 180° to provide optimum reaction conditions.

The structure of the jacket including the triangular cross-section of the jacket baffles along with the adjustable deflectors has several advantages. The adjustable deflectors optimize turbulence on the reactor wall and produce a higher Reynolds number. The higher water velocity through the jacket increases the overall heat transfer coefficient. The deflectors are adjustable to achieve optimum operating conditions. The heat exchange fluid energy consumption is increased. All of these result in higher reactor productivity. Consequently the increased polymer production per unit time increases the rate of return on capital investment. In addition the larger cross-section of the triangular jacket increases the total fluid flow through the space between the jacket and the reactor wall and lowers the differential pressure between the fluid inlet and fluid outlet. Each deflector can also serve as a maintenance port for inspection for clogging.

BEST AND VARIOUS EMBODIMENTS FOR CARRYING OUT INVENTION

Figure 1:
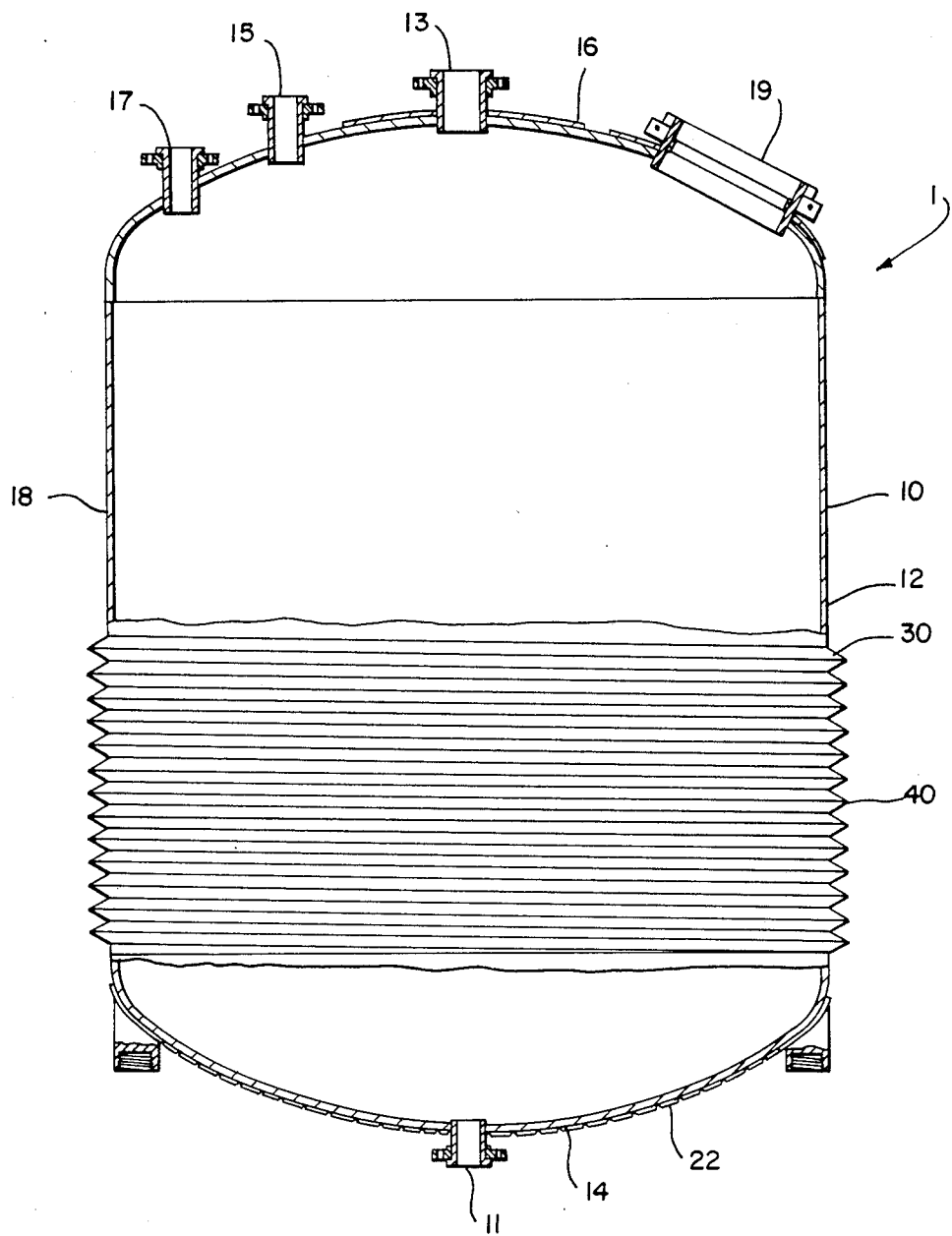
FIG. 1 shows the cross-section of the vessel with the jacket.
Figure 2:
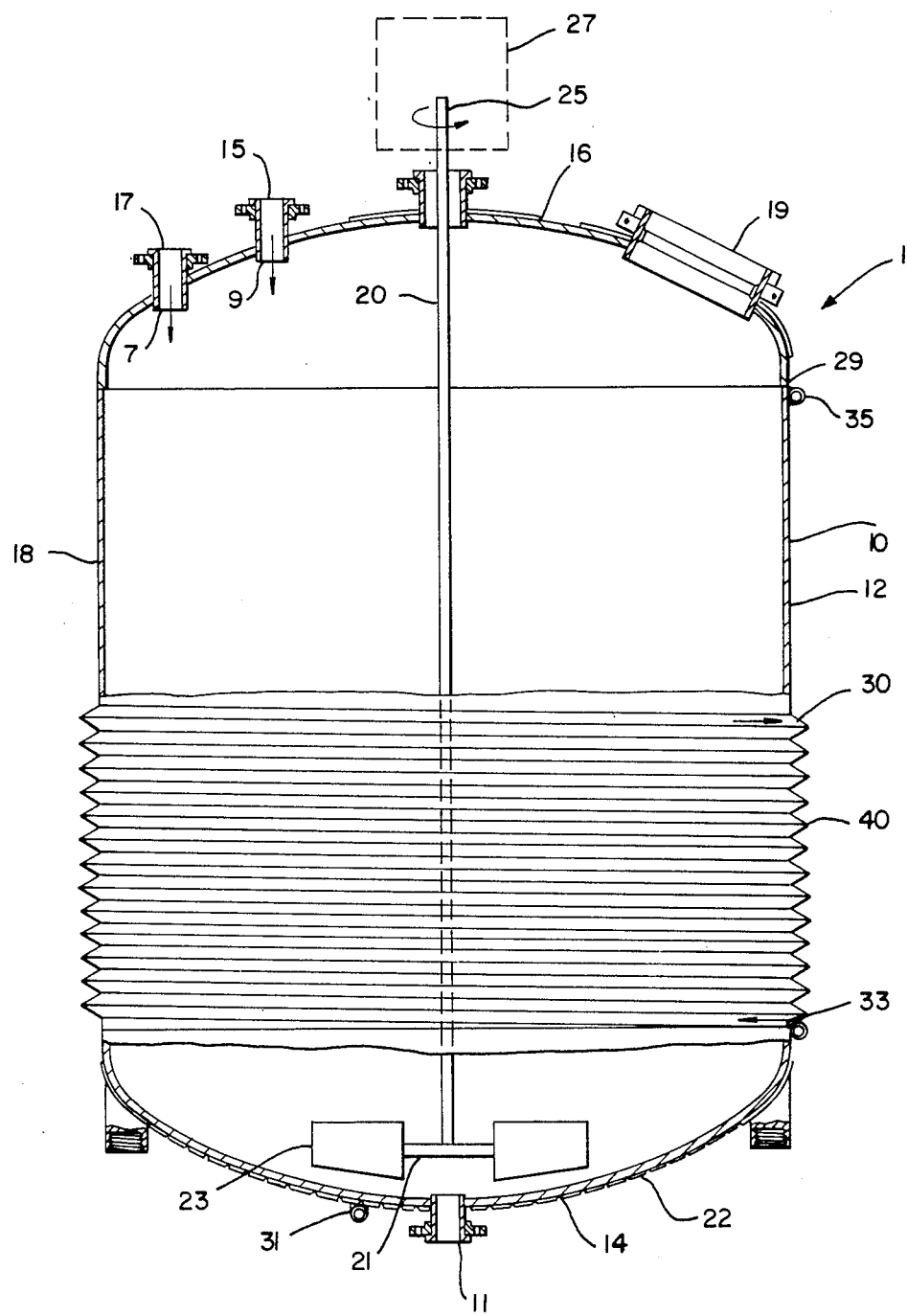
FIG. 2 shows the vessel with the reactant flow.

FIGS. 1 and 2 show reactor apparatus 1 comprising a reactor vessel 10. The reactor vessel 10 has a substantially cylindrical longitudinal portion 12 having an outer wall 18. At both ends the cylindrical portion 12 is closed by dish-like shaped top and bottom portions 16,14 which are welded to the reactor vessel 10. The ratio of the length of the cylindrical portion to the diameter of the top and bottom portions can vary with the design of the reactor but is usually in the range of from about, 0.9/1 to 2.5/1. The other shapes for top and bottom portions can be for example elliptical of torispherical heads. The bottom portion 14 is provided at its center part with a four (4) inch stub-end opening 11, which is welded to the bottom portion 14 and provides for unloading of the reactor 10. The top portion 16 at its center has stub-end opening 13 welded to the top portion, preferably about six (6) inches in diameter which allows insertion and installation of the shaft 20 within the vessel 10. Shaft 20 at its bottom end 21 is equipped with blades 23. Top end 25 is connected to transmission means 27 for counter clockwise rotation of the shaft 20. An appropriate mechanical seal is provided to maintain the internal pressure of the apparatus up to 220 lbs. per square inch. The top portion 16 is also provided with additional stub-end openings 15, 17 for loading the reactor with polymerizable monomers, initiators, surfactants and water, as indicated by arrows 7, 9 in FIG. 2. In addition an 18 inch manhole 19 is welded to the top portion 16 of the reactor apparatus for maintenance and cleaning thereof.

A reactor jacket 30 is provided along the cylindrical portion 12 of the reactor vessel 10. The jacket 30 is welded to the cylindrical portion 12. The structure of the jacket comprises a plurality of baffles 40 having triangular cross-section. Another conventional dimple jacket 22 is welded to the bottom dish-like shaped portion 14 of the reactor apparatus 10 and is connected to the triangular jacket 30 through a 3 inch pipe.

Figure 3:
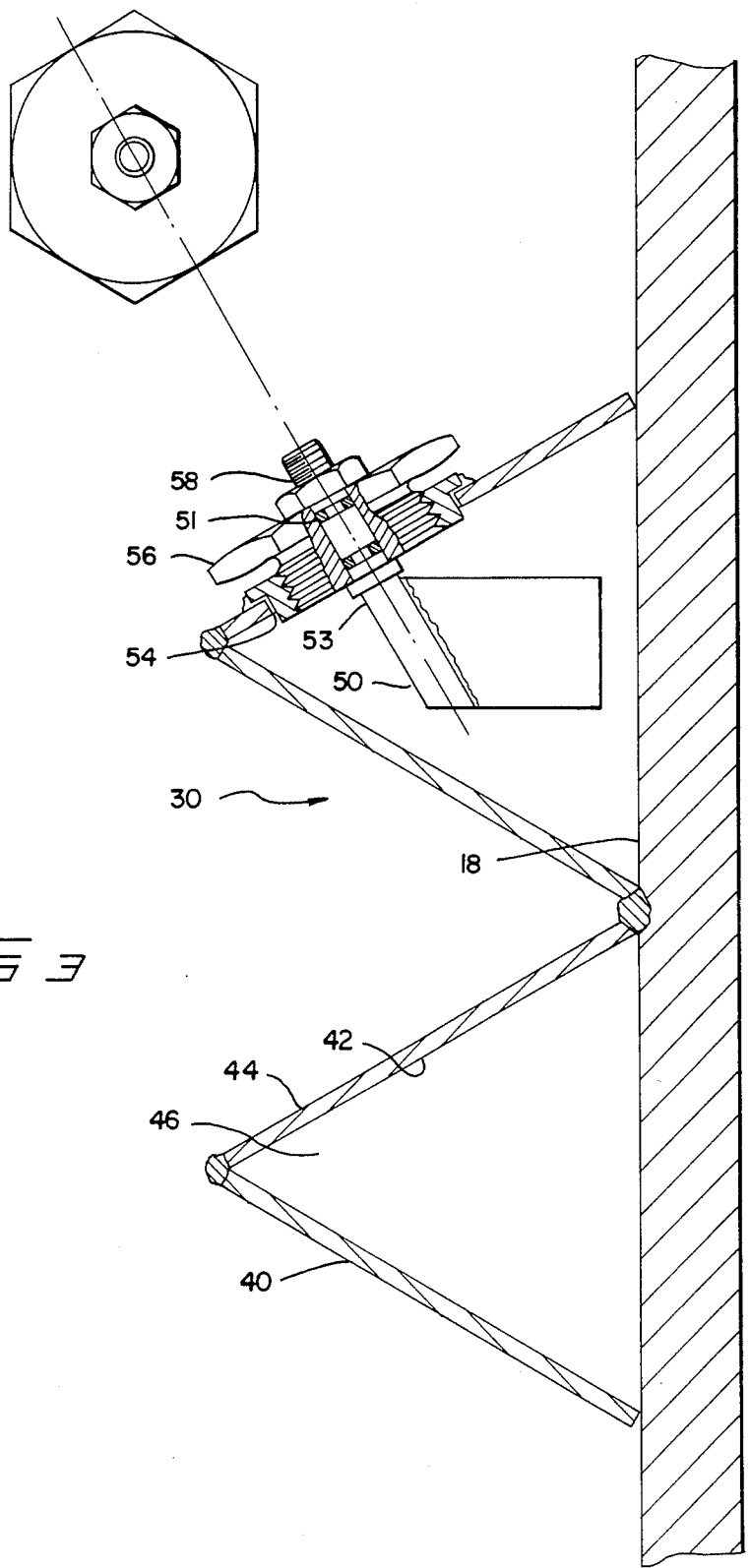
FIG. 3 shows in enlarged detail a cross-section through the jacket.

As is apparent from FIG. 3, a space 46 is formed between the inner wall 42 of the reactor jacket 30 and the outer wall 18 of the reactor vessel 10. Heat exchanging fluid is admitted within this space for regulating the temperature of the reaction.

The reactor apparatus is particularly advantageous for use for suspension polymerization processes. It is, however, quite effective for polymerization processes in general including emulsion and solution polymerization.

As shown in FIG. 2, water, such as demineralized water, is charged into the reactor vessel 10 through opening 15. Protective colloid solutions and surfactants are added to the demineralized water. After being stirred for a few minutes, a vinyl chloride monomer is added together with the polymerization initiator. The ratio of water to monomer varies with each process and manufacturer, but the usual amount of vinyl chloride to dimineralized water is about 1 to 1.5 to about 1 to 3.5. The total mixture within the vessel 10 should reach the upper weld line 29. The mixture is then heated with steam through the jacket 30 to a temperature which varies depending on the type of resin from about 50° to about 65° C. The final properties of polyvinyl chloride resin also depend on the process temperature. After reaching the process temperature the reaction becomes exothermic. It is very important at this point that the heat transferred from the reaction mass inside the reactor 10 be removed through the wall of the reactor vessel 12 and into the jacket 30 as effectively as possible.

Depending on the heating or cooling cycle, cooling water or steam are admitted through inlet 31 at the bottom portion 14. An arrow 33 indicates the clockwise flow of the heat exchanging fluid, for example cooling water through triangular jacket 30 up to an outlet 35. Outlet 35 is connected to the control weir (not shown).

The total reaction time depends on the overall heat transfer coefficient, type of initiators, monomer to water concentration, degree of agitation, blade design, and the like. The usual reaction time is from five to eight hours after reaching polymerization temperature depending on polymer properties, size of reactor, jacket design, etc. The advantageous structure of the jacket 30 according to the present invention lies in the triangular structure of the plurality of jacket baffles. The jacket baffles preferably cover substantially the entire surface of the central portion of the reactor vessel. The increased cross-section of the triangular jacket baffles increases the total water flow through the space between the jacket and the outer wall of the reactor vessel by about 10% per unit time, as compared, for example, with dimple jackets. The larger cross-section of the jacket baffles also lowers the differential pressure from fluid inlet to fluid outlet.

In one embodiment of the invention, shown in FIG. 3, jacket 10 includes a plurality of deflectors 50. The deflectors 50 are provided within a space 46 between the jacket 30 and the outer wall 18 of the reactor vessel 10 and are adjustably mounted to the wall of the jacket 30. The deflector 50 is inserted within the space 46 through the bore 54 in the wall of the jacket 30. First nut 56 is provided with a hole 51 bored in the center for insertion of the deflector shaft 53. The shaft 53 is sealed to the bore by two "O" rings. Second nut 58 is tightened onto first nut 56 to prevent the deflector shaft 53 from changing position once the optimum deflector angle with respect to the jacket wall 42 has been determined. The deflectors 50 can be adjusted with respect to the jacket 30 to any desired angle. The angle of rotation of the deflector, with respect to the jacket and the flow of fluid, e.g. cooling water, can actually vary from 0° to 180°. At 0° and 180° the deflector is parallel to cooling water flow. At an angle of 90° it is perpendicular to the wall of the reactor thus creating the maximum turbulence on the wall of the reactor vessel. At this point the maximum differential pressure P between the inlet water and outlet water is achieved. The optimization of turbulence on the reactor wall will achieve a higher Reynolds number. The most optimal angle is approximately 45°. The optimal angle provides the best results, higher turbulence, the highest Reynolds number and higher overall heat transfer co-efficient and in effect leads to reactors exhibiting increased productivity.

What is claimed is:

1. A reactor apparatus for reactions requiring temperature regulation comprising:

a reactor vessel having a hollow central portion enclosed by a top and a bottom portion, said central portion comprising an outer wall;

an outer sleeve surrounding said reactor vessel, said sleeve comprising a plurality of segments extending in the longitudinal direction of said reactor vessel, each segment having a triangular cross-section and including a pair of converging walls constituting sidewalls of a triangular baffle; said triangular baffle having a bottom portion formed by said outer wall of said reactor vessel; and, a space formed between said outer wall of said reactor vessel and inner surfaces of said pair of sidewalls of said triangular baffle for admitting a serial flow of heat exchange fluid through the reactor jacket for regulation of the reaction temperature, and wherein at lest some of said baffles are provided with adjustable deflection means, mounted within said space on one of said sidewalls of said baffle, whereby the deflection means can be adjusted and set to improve heat transfer through the outer wall of said reactor vessel.

2. A reactor jacket for use with a reactor apparatus comprising an elongated sleeve mounted on the outer wall of a reactor vessel, said sleeve comprising a plurality of baffles having a triangular cross-section, each baffle being formed by two converging walls constituting side walls of a triangle, said triangle having a bottom portion formed by the surface of said outer wall of said reactor vessel, said two side walls and said bottom portion defining a triangular space therebetween for admitting a serial flow of heat exchange fluid through the reactor jacket for regulation of the reaction temperature and wherein at least some of said baffles are provided with adjustable deflection means, mounted within said triangular space on said sidewall, whereby the deflection means can be adjusted and set to improve heat transfer through the outer wall of said reactor vessel.

3. A reactor jacket according to claim 2 wherein an angle of adjustment is in the range of about 0°–180°.

4. A reactor apparatus for chemical reactions requiring temperature regulation comprising:

a reactor vessel having a substantially cylindrical portion, closed at both ends by dish-like shaped portions, said cylindrical portion comprising an outer wall, a jacket comprising comprising a plurality of baffles mounted onto and surrounding said cylindrical portion, said baffles having inner and outer walls and substantially triangular cross-section;

means for admitting a serial flow of heat exchanging fluid into a space formed between said outer wall of said cylindrical portion and inner walls of said baffles of said jacket for regulating the temperature of the reaction; and wherein at least some of said baffles are provided with adjustable deflectors mounted on the walls of said baffles within said space, whereby the deflection means can be adjusted and set to improve heat transfer through the outer wall of said reactor vessel.

5. A reactor apparatus according to claim 4 wherein said jacket covers substantially the entire surface of said cylindrical portion.

6. A reactor apparatus according to claim 5 further comprising means for adjusting a deflection angle between said baffle's inner wall and a deflector.

7. A reactor apparatus according to claim 6 wherein the angle of adjustment of said deflector position with respect to said inner wall of said baffle is in the range of about 0° to 180°.

8. A reactor apparatus according to claim 6 wherein said deflector is mounted at a 45° angle with respect to said baffle's inner wall.

9. A reactor apparatus according to claim 6 wherein said means for adjusting comprises first and second screws.

10. A reactor apparatus according to claim 4 further comprising means for adjusting a deflection angle between said baffle's inner wall and a deflector.

11. A reactor apparatus according to claim 1 wherein an angle of adjustment of said deflection means is in the range of about 0°–180°.

* * * * *